US009753787B2

United States Patent
Jin et al.

(10) Patent No.: US 9,753,787 B2
(45) Date of Patent: Sep. 5, 2017

(54) MULTIPLE PROCESSOR MODES EXECUTION METHOD AND APPARATUS INCLUDING SIGNAL HANDLING

(71) Applicant: Intel Corporation, Santa Clara, CA (US)

(72) Inventors: Yihua Jin, Shanghai (CN); Xiao Dong Lin, Shanghai (CN); Yong Wu, Shanghai (CN); Jianhui Li, Shanghai (CN); Xueliang Zhong, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 14/724,394

(22) Filed: May 28, 2015

(65) Prior Publication Data

US 2016/0350161 A1   Dec. 1, 2016

(51) Int. Cl.
| | |
|---|---|
| G06F 9/54 | (2006.01) |
| G06F 12/0842 | (2016.01) |
| G06F 9/46 | (2006.01) |
| G06F 12/02 | (2006.01) |

(52) U.S. Cl.
CPC ............... *G06F 9/54* (2013.01); *G06F 9/466* (2013.01); *G06F 12/0842* (2013.01); *G06F 12/0284* (2013.01); *G06F 2212/1044* (2013.01); *G06F 2212/283* (2013.01); *G06F 2212/608* (2013.01); *G06F 2212/62* (2013.01)

(58) Field of Classification Search
None
See application file for complete search history.

(56) References Cited

U.S. PATENT DOCUMENTS

| | | | | |
|---|---|---|---|---|
| 5,774,686 A | * | 6/1998 | Hammond | G06F 9/30181 712/209 |
| 2004/0168078 A1 | * | 8/2004 | Brodley | G06F 21/52 713/190 |
| 2009/0172713 A1 | * | 7/2009 | Kim | G06F 9/30145 719/331 |
| 2010/0333206 A1 | * | 12/2010 | Dewan | G06F 21/53 726/26 |
| 2013/0166886 A1 | * | 6/2013 | Sasanka | G06F 9/30098 712/216 |
| 2013/0305014 A1 | * | 11/2013 | Ebersole | G06F 9/30076 712/32 |
| 2016/0378545 A1 | * | 12/2016 | Ho | G06F 9/50 718/107 |

* cited by examiner

*Primary Examiner* — Tuan Dao
(74) *Attorney, Agent, or Firm* — Schwabe, Williamson & Wyatt, P.C.

(57) ABSTRACT

Apparatuses, methods and storage media associated with multiple processor modes execution are described herein. In embodiments, an apparatus may include a processor with a plurality of processor modes, including a first processor mode to address a first address space, and a second processor mode to address a second address space, the second address space including the first address space. The apparatus may further include a signal handler to handle a signal from a kernel, in the first processor mode; and a signal handler wrapper to switch the processor to the second processor mode on delivery of the signal from the kernel, save a current extra context of the second processor mode from the second register file to a user stack, switch the processor back to the first processor mode, then invoke the signal handler to handle the signal. Other embodiments may be described or claimed.

22 Claims, 4 Drawing Sheets

MULTIPLE PROCESSOR MODES EXECUTION METHOD AND APPARATUS INCLUDING SIGNAL HANDLING

TECHNICAL FIELD

The present disclosure relates to the field of computing. More particularly, the present disclosure relates to multiple processor modes execution method and apparatus, including signal handling.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

With advances in integrated circuit and computing technologies, increasing number of processors support 64-bit addressing providing larger 64-bit address spaces and extra registers for user applications. Further, for a number of processors, it is possible for developers to port only key parts of a legacy 32-bit application to 64-bit code and run the ported portion in 64-bit processor mode, while leaving the remaining parts unmodified and running in 32-bit processor mode. The hybrid application would use mode switch instruction to switch between the 32-bit processor mode and the 64-bit processor mode to execute the 32-bit and 64-bit code segments.

However, even when switching to 64-bit processor mode, the application process is still considered as a 32-bit application from the Operating System (OS) kernel's perspective. Typically, the kernel follows the 32-bit signal application binary interface (ABI) to preserve only the 32-bit context across signal handling, so any 64-bit extra context could be polluted if a 32-bit application (such as a signal handler) unintentionally modifies them. Due to this limitation, even switching to 64-bit processor mode, the 32-bit application still cannot use the 64-bit extra registers freely.

BRIEF DESCRIPTION OF THE DRAWINGS

Embodiments of the multiple processor modes execution technique of the present disclosure may overcome this limitation. The technique will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Apparatuses, methods and storage media associated with multiple processor modes execution are described herein. In embodiments, an apparatus may include a processor with a plurality of processor modes, including a first processor mode to operate on first register file, and a second processor mode to operate on second register file, the second register file including the first register file. The apparatus may further include a signal handler to handle a signal from a kernel, in the first processor mode; and a signal handler wrapper to switch the processor to the second processor mode on delivery of the signal from the kernel, save a current extra context of the second processor mode from the second register file to a user stack, switch the processor back to the first processor mode, then invoke the signal handler to handle the signal.

In embodiments, the signal handler wrapper, on handling of the signal by the signal handler, may further switch the processor to the second processor mode again to call a signal-return system call that restores all contexts including the saved extra context back to the second register file, and thereafter, resumes user code execution.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
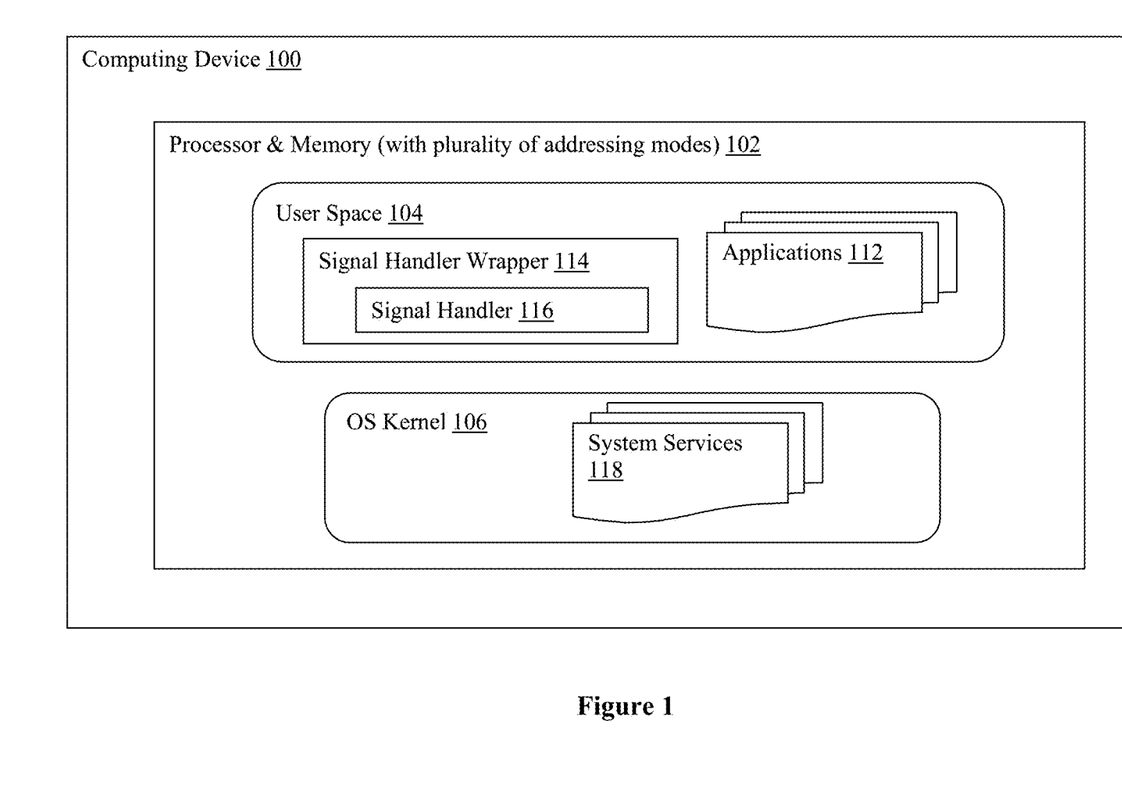
FIG. 1 is a block diagram of a computing device incorporated with the multiple processor modes execution technique of the present disclosure, according to various embodiments.

Referring now to FIG. 1, wherein a block diagram of a computing device incorporated with the multiple processor modes execution technique of the present disclosure, according to various embodiments, is shown. As illustrated, computing device 100 may include processor and memory arrangement 102, having at least one processor and an amount of memory. The at least one processor supports multiple processor modes including a first processor mode to address a first address space, and a second processor mode to address a second larger address space that includes the first address space. For example, the first processor mode may be a 32-bit processor mode to operate on 32-bit register file and address a 32-bit address space, whereas the second processor mode may be 64-bit processor mode to operate on 64-bit register file that includes a 32-bit register file and address a 64-bit address space that includes the 32-bit address space. The amount of memory may include any amount and/or levels of volatile and/or non-volatile memory.

The processor and memory arrangement 102 may host the execution of OS kernel 106 offering a number of system services 118, and the execution of applications 112 in user space 104. An example of OS kernel 106 may be the Linux kernel. Applications 112 may include any number of applications to be executed in the first processor mode, the second processor mode or a combination of the two modes. System services 118 may include a wide range of system services known in the art, including, but are not limited to, a signaling service. The signal service may include a delivery service of a signal from kernel 106 to a signal handler in user space 104, e.g., 114/116, registered with kernel 106 to handle the signal, in response to an interrupt or a trap to kernel 106; and a registration service to register signal handlers. Accordingly, user space 104 may further include signal handler 116 to handle a signal from kernel 106. Advantageously, signal handler 116 may be implemented as a function of signal handler wrapper 114, which may register itself with kernel 106 to handle the signal in lieu of signal handler 116. Further, signal handler wrapper 114 may be configured to facilitate preservation of the extra context across the processor modes during signal handling, thereby enabling application segments executing in the first processor mode to freely use the extra registers available in the second processor mode.

The term "extra context" as used herein refers to the "extra" portion of the execution context between the two processor modes. For example, the "extra" context between the 32-bit processor mode and the 64-bit processor mode refers to the "extra" portion of the execution context, which comes from "extra" portion of register file between 32-bit process mode and 64-bit processor mode.

Except for the multiple processor modes execution technique of the present disclosure that preserves the extra context during signal handling, computing device 100, otherwise, may be any one of a number of computing devices known in the art, e.g., a wearable device, a smartphone, a computing tablet, a notebook computer, a laptop computer, a desktop computer, a server, a set-top box, a game console, a camera, and so forth.

Figure 2:
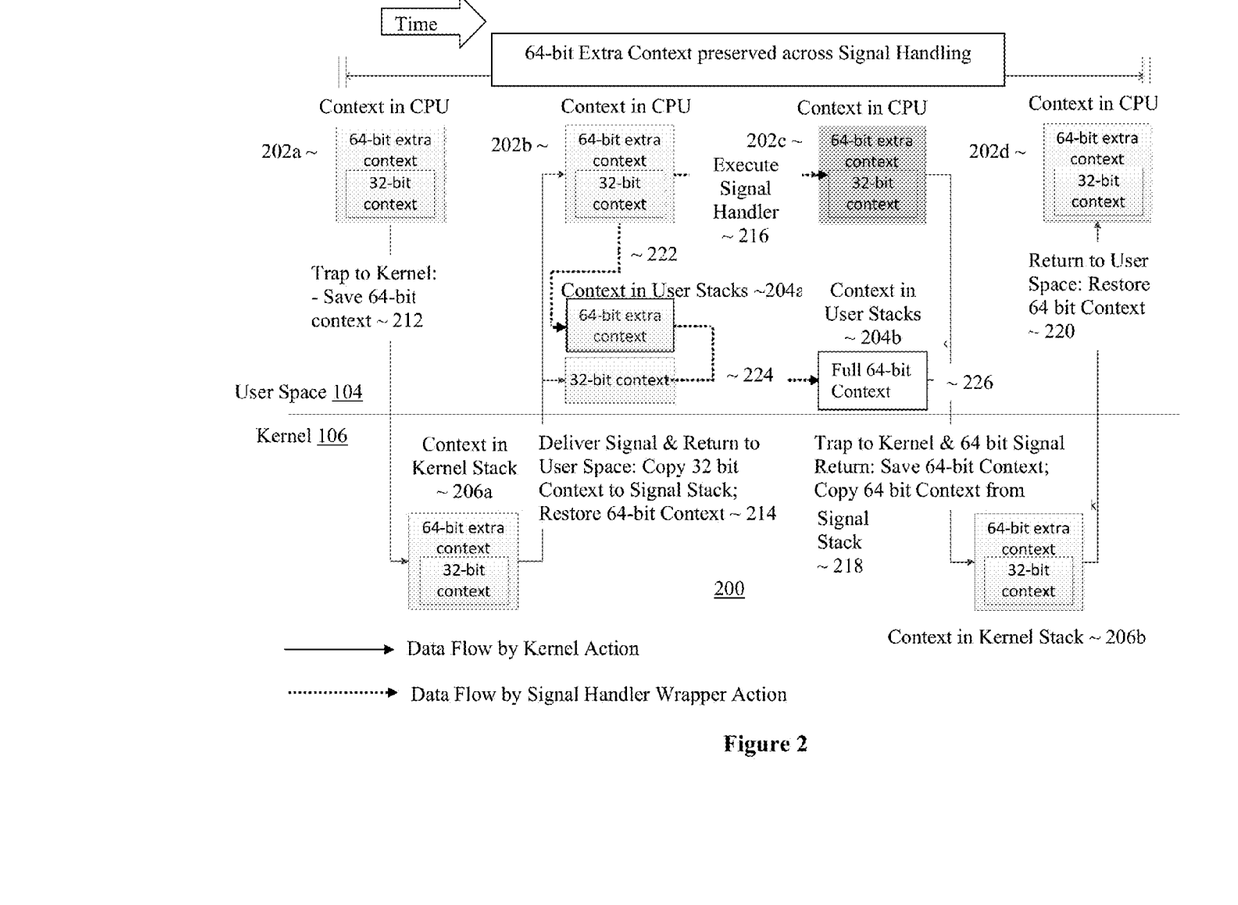
FIG. 2 illustrates preservation of the extra context during signal handling, according to various embodiments.

Referring now to FIG. 2, wherein preservation of the extra context during signal handling, according to various embodiments, is illustrated. For ease of understanding, the preservation of the extra context will be described in terms of an example preservation of a 64-bit extra context during signal handling, across execution in 32-bit and 64-bit processor modes. However, the present disclosure is not limited to 32-bit and 64-bit processor modes, and may be practiced with other processor modes. Further, the terms "processor" and "CPU" may be used interchangeably; and unless clearly indicated otherwise, the terms should be considered as synonymous.

Starting from the left side of FIG. 2, as execution is trapped 212 from user space 104 to kernel 106, in embodiments, kernel 106 may copy from CPU context 202a, and save a copy of the full 64-bit context 206a, that includes both the 32-bit context and the 64-bit extra context.

Next, kernel 106 may deliver a signal and return execution control 214 to user space 104. As part of the delivery and return 214, kernel 106 may copy the 32-bit context saved in kernel 106 to a user stack 204a in user space 104. Additionally, kernel 106 may cause the full 64-bit context to be restored as the CPU context 202b. Further, on receipt of the signal (e.g., by virtue of its registration with kernel 106), signal handler wrapper 114 may switch the CPU to the 64-bit processor mode, and save 222 the current CPU 64-bit extra context to user stack 204a (which may be a different portion of the same user stack used to store the 32-bit context saved by kernel 106, or a different user stack). Thereafter, signal handler wrapper 114 may switch the CPU back to the 32-bit processor mode, and then invoke the signal handler 116 to handle the signal. In embodiments, signal handler 116 may be invoked as a function of signal handler wrapper 114.

At 216, signal handler 116 may be executed, in the 32-bit processor mode, which may result in the 64-bit extra context of CPU context 202c being contaminated. To overcome the potential contamination, and ensure such contamination, if any, will not persist when execution continues after service of the signal, signal handler wrapper 114 may be configured to further form and save, in parallel, a full 64-bit context 226 reflective of the CPU context prior to the execution 216 of signal handler 116. In embodiments, signal handler wrapper 114 may allocate another user stack 204b to form and save full 64-bit context 226 by copying the 32-bit context and the 64-bit extra context saved in user stack(s) 204a.

Thereafter, on forming and saving full 64-bit context 226 and on completion of execution of signal handler 116 (e.g., when signal handler 116, invoked as a function, returns), signal handler wrapper 114 may then switch the CPU to 64-bit processor mode again, and execute 226 a 64-bit signal return to kernel 106.

As execution again is trapped to kernel 106, 218, kernel 106 may make a copy 206b of CPU context 202c, but effectively replace it, when it further copies full 64-bit context 226 from user stack 204b. Thereafter, at 220, kernel 106 may return to user space 104.

As part of returning to user space 104, kernel 106 may cause the CPU context 202d to be restored using its saved copy 206b, thereby preserving the 64-bit extra context across the 32-bit and 64-bit processor modes during signal handling, as CPU context 202d is identical to CPU 202a; this CPU context can be viewed as going through 202a→206a→206b→202d. In turn, the 32-bit code segment of a hybrid application may freely use the extra 64-bit registers available, without having to be concerned with polluting the 64-bit extra context.

Following is an example pseudo code of the operational flows earlier described for signal handler wrapper:

```
void signal_handler_wrapper ( void* 32_bit_context_p )
{
    // Earlier described operation 222: Switch to 64-bit processor
    mode; Save 64-bit extra context; and Invoke signal handler
        switch_to_64_bit_mode( );
```

```
        void* 64_bit_extra_context_p =
        save_cpu_64_bit_extra_context( );
        signal_handler_body( );
        // Earlier described operation 224: Form full 64-bit context
        new_stack_p = allocate_stack(32_bit_context_p,
    64_bit_extra_context);
        change_stack(new_stack_p);
        // Earlier described operation 226: Switch to 64-bit processor
    mode; and Signal Handling Return Call to Kernel
        switch_to_64_bit_mode( );
        call_64_bit_sigreturn( );
    }
```

Figure 3:
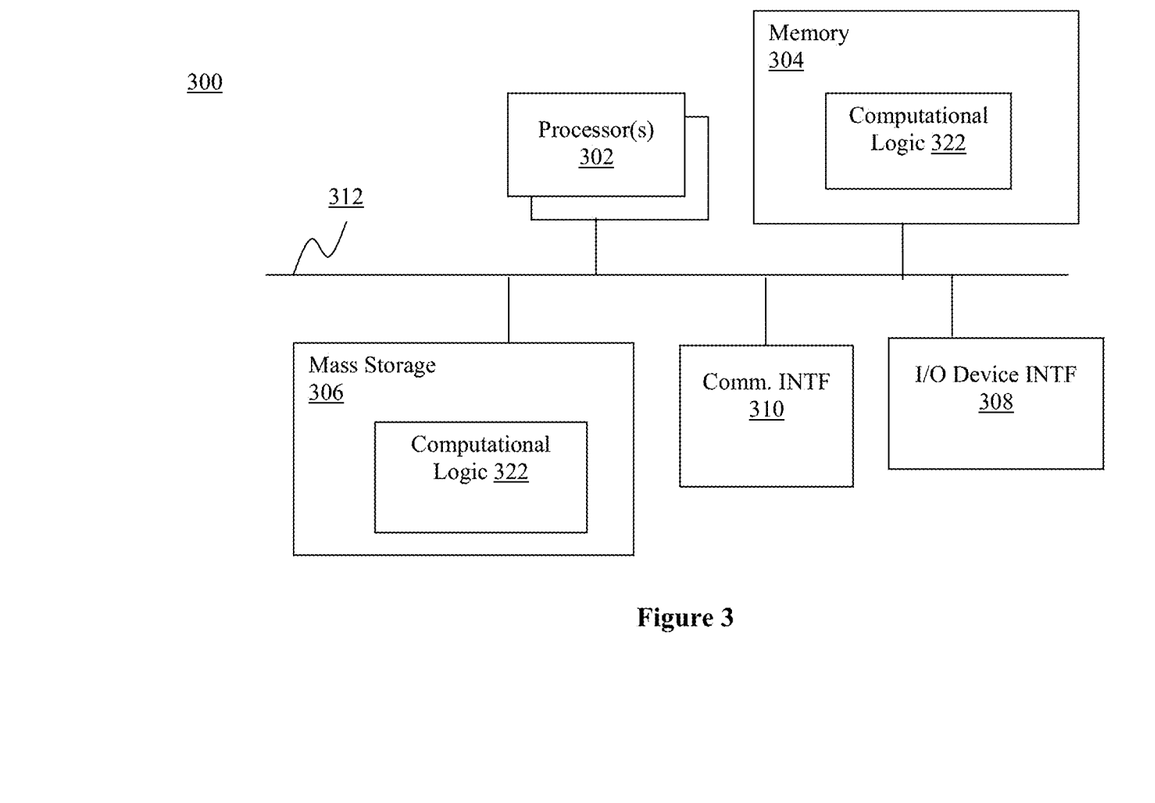
FIG. 3 illustrates an example computer system suitable for use to practice various aspects of the present disclosure, according to various embodiments.

FIG. 3 illustrates an example computer system that may be suitable for use to practice selected aspects of the present disclosure. As shown, computer 300 may include one or more processors or processor cores 302, and system memory 304. One or more processors or processor cores 302 may include support for multiple processor modes, e.g., 32-bit and 64-bit processor modes, as earlier described. For the purpose of this application, including the claims, the term "processor" refers to physical hardware processor. Further, the terms "processor" and "processor cores" may be considered synonymous, unless the context clearly requires otherwise. Additionally, computer 300 may include mass storage devices 306 (such as diskette, hard drive, compact disc read only memory (CD-ROM) and so forth), input/output devices 308 (such as display, keyboard, cursor control and so forth) and communication interfaces 310 (such as network interface cards, modems and so forth). The elements may be coupled to each other via system bus 312, which may represent one or more buses. In the case of multiple buses, they may be bridged by one or more bus bridges (not shown).

Each of these elements may perform its conventional functions known in the art. In particular, system memory 304 and mass storage devices 306 may be employed to store a working copy and a permanent copy of the programming instructions implementing the operations associated with kernel 106, applications 112, signal handler wrapper 114 having signal handler 116, and/or system services 118, as earlier described, collectively referred to as computational logic 322. The various elements may be implemented by assembler instructions supported by processor(s) 302 or high-level languages, such as, for example, C, that can be compiled into such instructions.

The number, capability and/or capacity of these elements 310-312 may vary, depending on whether computer 300 is used as a stationary, such as a desktop computer, a server, a set-top box, a game console, and so forth, or used as mobile client computing device, such as a wearable device, a smartphone, a computing tablet, an ultrabook, a laptop computer, or a camera. Otherwise, the constitutions of elements 310-312 are known, and accordingly will not be further described.

Figure 4:
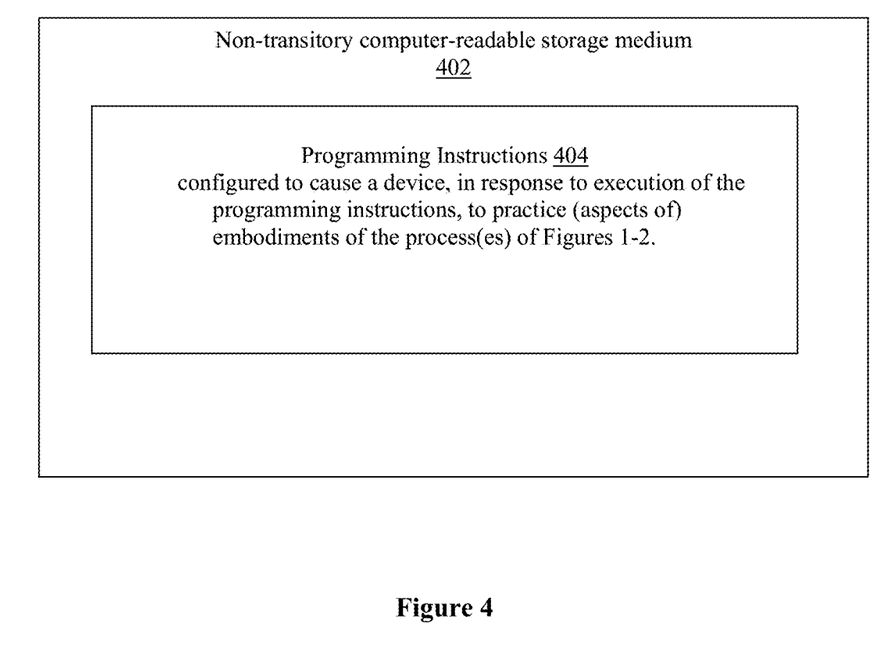
FIG. 4 illustrates a storage medium having instructions for practicing methods described with references to FIG. 2, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 4 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 402 may include a number of programming instructions 404. Programming instructions 404 may be configured to enable a device, e.g., computer 300, in response to execution of the programming instructions, to perform operations associated with kernel 106, applications 112, signal handler wrapper 114 having signal handler 116, and/or system services 118. In alternate embodiments, programming instructions 404 may be disposed on multiple computer-readable non-transitory storage media 402 instead. In alternate embodiments, programming instructions 404 may be disposed on computer-readable transitory storage media 402, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 3, for one embodiment, at least one of processors 302 may be packaged together with memory having computational logic 322 or portion thereof, such as signal handler 114, (in lieu of storing on memory 304 and storage 306). For one embodiment, at least one of processors 302 may be packaged together with memory having computational logic 322, or portion thereof, such as signal handler 114, to form a System in Package (SiP). For one embodiment, at least one of processors 302 may be integrated on the same die with memory having computational logic 322, or portion thereof, such as signal handler 114. For one embodiment, at least one of processors 302 may be packaged together with memory having computational logic 322, or portion thereof, such as signal handler 114, to form a System on Chip (SoC). For at least one embodiment, the SoC may be utilized in, e.g., but not limited to, a wearable device, a smartphone or a computing tablet.

Thus various example embodiments of the present disclosure have been described including, but are not limited to:

Example 1 may be an apparatus for computing, comprising: a processor with a plurality of processor modes, including a first processor mode to address a first address space and operate on a first register file, and a second processor mode to address a second address space and operate on a second register file, wherein the second address space includes the first address space and the second register file includes the first register file; and a signal handler to be operated by the processor, in the first processor mode, to handle a signal from a kernel operated by the processor. The apparatus may further include a signal handler wrapper to be operated by the processor to switch the processor to the second processor mode on delivery of the signal from the kernel, save a current extra context of the second processor mode from the second register file to a user stack, switch the processor back to the first processor mode, then invoke the signal handler to handle the signal.

Example 2 may be example 1, wherein the user stack may be a first user stack, and as part of the delivery of the signal, the kernel may save a context of the first processor mode into a second user stack; and wherein the signal handler wrapper may further allocate a third user stack; and copy into the third user stack, from the second user stack, the context of the first processor mode saved into the second user stack by the kernel, and from the first user stack, the saved extra context of the second processor mode, to form a to be restored full context of the second processor mode.

Example 3 may be example 2, wherein the signal handler wrapper may further, on formation of the to be restored full context of the second processor mode, and handling of the signal by the signal handler, switch the processor to the second processor mode; and execute a signal-return system call to the kernel.

Example 4 may be example 3, wherein the signal handler wrapper, as part of the execution of the signal-return system call to the kernel, may provide a location of the third user stack to the kernel.

Example 5 may be example 2, wherein the first, second and third user stacks may be different portions of the same user stack.

Example 6 may be example 1, wherein the signal handler may be implemented as a function of the signal handler wrapper.

Example 7 may be example 1, wherein the signal handler wrapper may register itself with the kernel as a handler of the signal, in lieu of the signal handler.

Example 8 may be any one of examples 1-7, wherein first processor mode may be a 32-bit processor mode to address a 32-bit address space, and the second processor mode may be a 64-bit processor mode to address a 64-bit address space that includes the 32-bit address space.

Example 9 may be example 8, wherein the kernel may be a Linux kernel.

Example 10 may be example 8, wherein the apparatus may be a selected one of a wearable device, a smartphone, a computing tablet, a laptop computer, a desktop computer, a server, a set-top box, a game console, or a camera.

Example 11 may be a method for computing, comprising: receiving, by a signal handler wrapper operated by a processor of a computing device, from a kernel operated by the processor, a signal to be handled, wherein the processor has a plurality of processor modes, including a first processor mode that addresses a first address space and operates on a first register file, and a second processor mode that addresses a second address space and operates on a second register file, the second address space including the first address space, and the second register file including the first register file; and in response to receipt of the signal, the signal handler wrapper switching the processor to the second processor mode, saving a current extra context of the second processor mode from the second register file to a user stack, switching the processor back to the first processor mode, then invoking the signal handler to handle the signal.

Example 12 may be example 11, wherein the user stack may a first user stack, and as part of providing the signal to the signal handler wrapper, the kernel saving a context of the first processor mode into a second user stack; and wherein the method may further comprise: allocating, by the signal handler wrapper, a third user stack; and copying into the third user stack, from the second user stack, by the signal handler wrapper, the context of the first processor mode saved into the second user stack by the kernel, and from the first user stack, the saved extra context of the second processor mode, forming a to be restored full context of the second processor mode.

Example 13 may be example 12, wherein the method may further comprise the signal handler wrapper, on forming of the to be restored full context of the second processor mode, and handling of the signal by the signal handler, switching the processor to the second processor mode; and executing a signal-return system call to the kernel.

Example 14 may be example 13, wherein the method may further comprise the signal handler wrapper, as part of executing the signal-return system call to the kernel, providing a location of the third user stack to the kernel.

Example 15 may be example 12, wherein the first, second and third user stacks may be different portions of the same user stack.

Example 16 may be example 11, wherein the signal handler may be implemented as a function of the signal handler wrapper.

Example 17 may be example 11, wherein the method may further comprise the signal handler wrapper registering itself with the kernel as a handler of the signal, in lieu of the signal handler.

Example 18 may be any one of examples 11-17, wherein the first processor mode may be a 32-bit processor mode to address a 32-bit address space and operate on a 32-bit register file, and the second processor mode may be a 64-bit processor mode to address a 64-bit address space that includes the 32-bit address space, and operate on a 64-bit register file that includes the 32-bit register file.

Example 19 may be one or more computer-readable media comprising instructions that cause a computing device, in response to execution of the instructions by a processor of the computing device, to provide a signal handler wrapper to: receive from a kernel operated by the processor, a signal to be handled, wherein the processor has a plurality of processor modes, including a first processor mode to address a first address space and operate on a first register file, and a second processor mode to address a second address space and operate on a second register file, wherein the second address space includes the first address space, and the second register file includes the first register file; and in response to receipt of the signal, switch the processor to the second processor mode, save a current extra context of the second processor mode from the second register file to a user stack, switch the processor back to the first processor mode, then invoke the signal handler to handle the signal.

Example 20 may be example 19, wherein the user stack is a first user stack, and as part of the delivery of the signal, the kernel saves a context of the first processor mode into a second user stack; and wherein the signal handler wrapper may further allocate a third user stack; and copy into the third user stack, from the second user stack, the context of the first processor mode saved into the second user stack by the kernel, and from the first user stack, the saved extra context of the second processor mode, to form a to be restored full context of the second processor mode.

Example 21 may be example 20, wherein the signal handler wrapper may further, on formation of the to be restored full context of the second processor mode, and handling of the signal by the signal handler, switch the processor to the second processor mode; and execute a signal-return system call to the kernel.

Example 22 may be example 21, wherein the signal handler wrapper, as part of the execution of the signal-return system call to the kernel, may provide a location of the third user stack to the kernel.

Example 23 may be example 20, wherein the first, second and third user stacks may be different portions of the same user stack.

Example 24 may be example 19, wherein the signal handler may be implemented as a function of the signal handler wrapper.

Example 25 may be example 19, wherein the signal handler wrapper may register itself with the kernel as a handler of the signal, in lieu of the signal handler.

Example 26 may be any one of examples 19-25, wherein first processor mode may be a 32-bit processor mode to address a 32-bit address space, and the second processor mode may be a 64-bit processor mode to address a 64-bit address space that includes the 32-bit address space.

Example 27 may be example 26, wherein the kernel is a Linux kernel.

Example 28 may be example 26, wherein the computing device may be a selected one of a wearable device, a smartphone, a computing tablet, a laptop computer, a desktop computer, a server, a set-top box, a game console, or a camera.

Example 29 may be an apparatus for computing, comprising: means for receiving from a kernel operated by a processor, a signal to be handled, wherein the processor has a plurality of processor modes, including a first processor mode to address a first address space, and a second processor mode to address a second address space, the second address space including the first address space; and means for responding to receipt of the signal, including means for switching the processor to the second processor mode, means for saving a current extra context of the second processor mode from the second register file to a user stack, means for switching the processor back to the first processor mode, and means for then invoking the signal handler to handle the signal.

Example 30 may be example 29, wherein the user stack may be a first user stack, and as part of providing the signal to the signal handler wrapper, the kernel saving a context of the first processor mode into a second user stack; and wherein the apparatus may further comprise: means for allocating a third user stack; and means for copying into the third user stack, from the second user stack, the context of the first processor mode saved into the second user stack by the kernel, and from the first user stack, the saved extra context of the second processor mode, forming a to be restored full context of the second processor mode.

Example 32 may be example 30, wherein the apparatus may further comprise means for switching the processor to the second processor mode; and executing a signal-return system call to the kernel, on forming of the to be restored full context of the second processor mode and handling of the signal by the signal handler.

Example 32 may be example 31, wherein the apparatus may further comprise means for providing a location of the third user stack to the kernel, as part of executing the signal-return system call to the kernel.

Example 33 may be example 30, wherein the first, second and third user stacks may be different portions of the same user stack.

Example 34 may be example 29, wherein the apparatus may further comprise means for registering with the kernel as a handler of the signal, in lieu of the signal handler.

Example 35 may be example 29-34, wherein the first processor mode may be a 32-bit processor mode to address a 32-bit address space and operate on a 32-bit register file, and the second processor mode may be a 64-bit processor mode to address a 64-bit address space that includes the 32-bit address space, and operate on a 64-bit register file that includes the 32-bit register file.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
a processor with a plurality of processor modes to execute a plurality of applications in selected one or ones of the processor modes, wherein the plurality of processor modes include a first processor mode to address a first address space and operate on a first register file, and a second processor mode to address a second address space and operate on a second register file, wherein the second address space includes the first address space and the second register file includes the first register file;
a signal handler, separate from the plurality of applications and an operating system, to be operated by the processor, in the first processor mode, to handle a signal from a kernel of the operating system operated by the processor; and
a signal handler wrapper, separate from the plurality of applications and the operating system, to be operated by the processor to switch the processor to the second processor mode on delivery of the signal from the kernel, save a current extra context of the second processor mode from the second register file to a first user stack, switch the processor back to the first processor mode, then invoke the signal handler to handle the signal;
wherein as part of the delivery of the signal, the kernel saves a context of the first processor mode into a second user stack; and
wherein the signal handler wrapper is to further allocate a third user stack, and copy into the third user stack, from the second user stack, the context of the first processor mode saved into the second user stack by the kernel, and from the first user stack, the saved extra context of the second processor mode, to form a to be restored full context of the second processor mode.

2. The apparatus of claim 1, wherein the signal handler wrapper is to further, on formation of the to be restored full context of the second processor mode, and handling of the signal by the signal handler,
switch the processor to the second processor mode; and
execute a signal return call to the kernel.

3. The apparatus of claim 2, wherein the signal handler wrapper, as part of the execution of the signal return call to the kernel, is to provide a location of the third user stack to the kernel.

4. The apparatus of claim 1, wherein the first, second and third user stacks are different portions of the same user stack.

5. The apparatus of claim 1, wherein the signal handler is implemented as a function of the signal handler wrapper.

6. The apparatus of claim 1, wherein the signal handler wrapper is to register itself with the kernel as a handler of the signal, in lieu of the signal handler.

7. The apparatus of claim 1, wherein first processor mode is a 32-bit processor mode to address a 32-bit address space, and the second processor mode is a 64-bit processor mode to address a 64-bit address space that includes the 32-bit address space.

8. The apparatus of claim 7, wherein the kernel comprises a Linux kernel.

9. The apparatus of claim 7, wherein the apparatus comprises a selected one of a wearable device, a smartphone, a computing tablet, a laptop computer, a desktop computer, a server, a set-top box, a game console, or a camera.

10. A method for computing, comprising:
receiving, by a signal handler wrapper operated by a processor of a computing device, from a kernel of an operating system operated by the processor, a signal to be handled, wherein the processor has a plurality of processor modes to execute a plurality of applications in selected one or ones of the processor modes, including a first processor mode that addresses a first address space and operates on a first register file, and a second processor mode that addresses a second address space and operates on a second register file, the second address space including the first address space, and the second register file including the first register file, and wherein the signal handler wrapper is separate from the plurality of applications and the operating system; and in response to receipt of the signal, the signal handler wrapper
switching the processor to the second processor mode,
saving a current extra context of the second processor mode from the second register file to a first user stack,
switching the processor back to the first processor mode,
then invoking a signal handler to handle the signal;

wherein as part of providing the signal to the signal handler wrapper, the kernel saving a context of the first processor mode into a second user stack; and wherein the method further comprises
allocating, by the signal handler wrapper, a third user stack; and
copying into the third user stack, from the second user stack, by the signal handler wrapper, the context of the first processor mode saved into the second user stack by the kernel, and from the first user stack, the saved extra context of the second processor mode, forming a to be restored full context of the second processor mode.

11. The method of claim 10, wherein the method further comprises the signal handler wrapper, on forming of the to be restored full context of the second processor mode, and handling of the signal by the signal handler, switching the processor to the second processor mode; and executing a signal return call to the kernel.

12. The method of claim 11, wherein the method further comprises the signal handler wrapper, as part of executing the signal return call to the kernel, providing a location of the third user stack to the kernel.

13. The method of claim 10, wherein the first, second and third user stacks are different portions of the same user stack.

14. The method of claim 10, wherein the signal handler is implemented as a function of the signal handler wrapper.

15. The method of claim 10, wherein the method further comprises the signal handler wrapper registering itself with the kernel as a handler of the signal, in lieu of the signal handler.

16. The method of claim 10, wherein the first processor mode is a 32-bit processor mode to address a 32-bit address space and operate on a 32-bit register file, and the second processor mode is a 64-bit processor mode to address a 64-bit address space that includes the 32-bit address space, and operate on a 64-bit register file that includes the 32-bit register file.

17. One or more non-transitory computer-readable media comprising instructions that cause a computing device, in response to execution of the instructions by a processor of the computing device, to provide a signal handler wrapper to:
receive from a kernel of an operating system operated by the processor, a signal to be handled, wherein the processor has a plurality of processor modes to execute a plurality of applications in selected one or ones of the processor modes, including a first processor mode to address a first address space and operate on a first register file, and a second processor mode to address a second address space and operate on a second register file, wherein the second address space includes the first address space, and the second register file includes the first register file, and wherein the signal handler wrapper is separate from the plurality of applications and the operating system; and in response to receipt of the signal, switch the processor to the second processor mode, save a current extra context of the second processor mode from the second register file to a first user stack, switch the processor back to the first processor mode, then invoke a signal handler to handle the signal;

wherein as part of delivery of the signal, the kernel saves a context of the first processor mode into a second user stack; and wherein the signal handler wrapper is to further
allocate a third user stack; and
copy into the third user stack, from the second user stack, the context of the first processor mode saved into the second user stack by the kernel, and from the first user stack, the saved extra context of the second processor mode, to form a to be restored full context of the second processor mode.

18. The one or more computer-readable media of claim 17, wherein the signal handler wrapper is to further, on formation of the to be restored full context of the second processor mode, and handling of the signal by the signal handler,
switch the processor to the second processor mode; and
execute a signal return call to the kernel.

19. The one or more computer-readable media of claim 18, wherein the signal handler wrapper, as part of the execution of the signal return call to the kernel, is to provide a location of the third user stack to the kernel.

20. The one or more computer-readable media of claim 17, wherein the first, second and third user stacks are different portions of the same user stack.

21. The one or more computer-readable media of claim 17, wherein the signal handler is implemented as a function of the signal handler wrapper; and wherein the signal handler wrapper is to register itself with the kernel as a handler of the signal, in lieu of the signal handler.

22. The one or more computer-readable media of claim 17, wherein first processor mode is a 32-bit processor mode to address a 32-bit address space, and the second processor mode is a 64-bit processor mode to address a 64-bit address space that includes the 32-bit address space.

* * * * *